(12) United States Patent
Leitner et al.

(10) Patent No.: US 9,189,674 B2
(45) Date of Patent: Nov. 17, 2015

(54) 2D BARCODE SCANNER

(71) Applicant: SKIDATA AG, Groedig/Salzburg (AT)

(72) Inventors: Markus Leitner, Rohrdorf (DE); Angelika Hofmann, Munich (DE)

(73) Assignee: SKIDATA AG, Groedig/Salzburg (AT)

( * ) Notice: Subject to any disclaimer, the term of this patent is extended or adjusted under 35 U.S.C. 154(b) by 0 days.

(21) Appl. No.: 14/639,303

(22) Filed: Mar. 5, 2015

(65) Prior Publication Data
US 2015/0254487 A1 Sep. 10, 2015

(30) Foreign Application Priority Data
Mar. 6, 2014 (EP) .................... 14158071

(51) Int. Cl.
*G06K 7/14* (2006.01)
*G06K 7/10* (2006.01)
(52) U.S. Cl.
CPC .......... *G06K 7/1417* (2013.01); *G06K 7/10732* (2013.01); *G06K 7/10742* (2013.01)
(58) Field of Classification Search
CPC ............ G06K 7/1417; G06K 7/10732; G06K 7/10742
See application file for complete search history.

(56) References Cited

FOREIGN PATENT DOCUMENTS

| EP | 2463804 A1 | 12/2011 |
|---|---|---|
| WO | 2008016510 A2 | 2/2008 |

*Primary Examiner* — Kristy A Haupt
(74) *Attorney, Agent, or Firm* — Karl F. Milde, Jr.; Eckert Seamans Cherin & Mellott, LLC

(57) ABSTRACT

A 2D barcode scanner (1) comprises a housing (2) having a reading window (3) and a digital camera (4) arranged in the housing (2) for detecting the area of the reading window (3) either directly or via a deflecting mirror arrangement (8, 9). At least one external light source (5) is provided for illuminating an area in front of the reading window (3) in the housing (2), at the side of the reading window (3) that is facing away from the digital camera (4). At least one external light source (5) is provided with an optical adapter (7) by which the light therefrom is distributed, such that the reflection paths are not illuminated at the inside of the reading window (3) back into the camera (4), or are illuminated with a very low intensity. This avoids or significantly reduces the intensity of the light reflections that arise on the inside of the reading window (3) and are superimposed on the barcode that is to be read as very bright spots in the image of the digital camera (4).

4 Claims, 2 Drawing Sheets

2D BARCODE SCANNER

BACKGROUND OF THE INVENTION

The present invention relates to a 2D barcode scanner comprising a housing having a reading window and a digital camera arranged in the housing for detecting the area of the reading window either directly or via one or more deflecting mirrors.

2D barcode scanners capture a one-dimensional or linear barcode, a QR code or other two-dimensional codes, all of which are hereinafter designated as "barcodes," by using a digital camera and electronic evaluation logic, coupled to the digital camera, which processes the image captured with the camera and determines the barcode number digitally. Using a 2D barcode scanner of this type, information arranged in a two-dimensional area can be read and evaluated advantageously in one step.

According to the prior art, 2D barcode scanners comprise a housing with a reading window for viewing the barcode that is placed in front of it. Arranged at the side of the reading window that faces away from the barcode to be read is a digital camera, which captures images that cover the reading window directly or via a deflecting mirror arrangement. Providing deflecting mirrors achieves a compact design since the distance between the camera lens and the reading window required for capturing the entire reading window is realized via the deflecting mirror.

As a rule, cameras integrated in 2D barcode scanners have integrated illumination in the form of one or more internal LEDs in order to illuminate the barcode area and thus to ensure an error-free image capture. However, the illumination achievable thereby is in practical applications not sufficient to capture the entire area of the reading window or to capture special barcode designs. This is the case, for example, when using barcode colors that have special properties in a defined range outside the visible light spectrum. These can be captured only by sufficient illumination in this defined range outside the visible light spectrum. In addition, the arrangement of the integrated illumination near the camera lens easily causes reflections at the reading window, which makes the evaluation of the data difficult or impossible.

For these reasons, it is known in the art to provide external light sources, e.g., LEDs, which can illuminate with sufficient brightness and homogeneity a barcode that is to be read and that is arranged on the side of the reading window facing away from the digital camera.

Light reflections arise here as well on the inside of the reading window even with anti-reflective glass. As a result the digital camera disadvantageously also captures a mirror image of the illumination that is superimposed on the barcode to be read. As rule, very bright spots, so-called hotspots, appear in the image of the digital camera, which can result in over-controlling the camera, making error-free barcode evaluation no longer possible.

Distributing the illumination to multiple light sources would decrease the intensity of the brightness of the individual hotspots but would disadvantageously increase the number of hotspots. Furthermore, improving and optimizing the anti-reflective coating on the inner side of the 2D barcode scanner's reading window would work only for a narrow wavelength range and would disadvantageously require illumination in a narrow bandwidth; that is, illumination in a very narrow frequency band, which would prevent reading of barcodes across the full color spectrum or even of spectra outside the visible wavelength range.

Another possibility of avoiding hotspots involves illuminating the reading window at an angle to the optical axis of the digital camera from the side, which leads to homogeneous illumination in the plane of the reading window. This also reduces the interfering hotspots or shifts them outside the image area, respectively. However, the disadvantage of this method is that the illumination and reading of the barcode are optimal only in one plane. Due to the very poor achievable homogeneity of the illumination across the depth, the result is unsuitable for illuminating areas further away from the reading window.

SUMMARY OF THE INVENTION

The problem addressed by the invention, therefore, is to provide a 2D barcode scanner that ensures a low-reflection, essentially homogeneous illumination across a depth range of several centimeters in front of the reading window.

In particular, the hotspots that occur when using light sources and that interfere with an error-free barcode evaluation are to be avoided.

This objective, as well as other objectives which will become apparent from the discussion that follows, are achieved, according to the present invention by providing a 2D barcode scanner comprising a housing having a reading window and a digital camera arranged in the housing for detecting the area of the reading window either directly or via a deflecting mirror arrangement, and at least one external light source for illuminating an area in front of the reading window at the side thereof facing away from the camera, wherein the at least one external light source includes an optical adapter by which the light therefrom is distributed such that the reflection paths arising for the at least one external light source directly or by any existing deflection mirror from the inside of the reading window back into the camera are not illuminated or are illuminated with a very low intensity. This arrangement avoids or significantly reduces the intensity of the light reflections that arise on the inside of the reading window and are superimposed on the barcode that is to be read as very bright spots, namely hotspots in the image of the digital camera.

Within the scope of one embodiment of the invention, it is proposed to arrange the at least one external light source in addition to the optical adapter such that the location of the arising hotspots is shifted to an edge of the reading window where reading of the barcode is less frequent or less probable. This further reduces the influence of the hotspots, which is reduced significantly by providing an optical adapter.

Through the concept of the beam design according to the invention, self-blinding of the digital camera of a 2D barcode scanner due to the reflection of the external source of the illumination at the inside of the reading window is avoided or reduced significantly. Furthermore, the influence of the hotspots is further reduced by the achievable shifting of the hotspots that arise with reduced intensity according to the invention to an edge of the reading window.

Here, the at least one external light source can be arranged in the plane of the digital camera of the 2D barcode scanner, thus achieving good homogeneity of the illumination across the depth; i.e., a uniform illumination of an area can be achieved not only directly in front of the reading window but also beyond that.

It is advantageous to use more than one external light source, which are preferably arranged in the plane of the digital camera. According to the invention, at least some of the external light sources can be arranged outside the plane of the digital camera, which can be the case in particular when using a deflecting mirror arrangement.

Here, the optical adapter associated with an external light source is designed individually for the respective light source and its orientation and arrangement, since as a rule each light source has a different radiation characteristic and only all external light sources together achieve a homogeneous illumination level in the plane of the reading window. As has already been explained, for each individual light source, the areas of the reading window with reflection paths into the camera are not or are only slightly illuminated. These areas are illuminated by those light sources for which this area is not a reflection path.

In the context of additional embodiments of the invention, a portion of the light sources that are preferably designed as LEDs can radiate in the visible range and a portion in the near-infrared range with a wavelength of 800 to 900 nm. In this manner, both conventional barcodes and barcodes that are readable in the near-infrared range can be read using a 2D barcode scanner.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
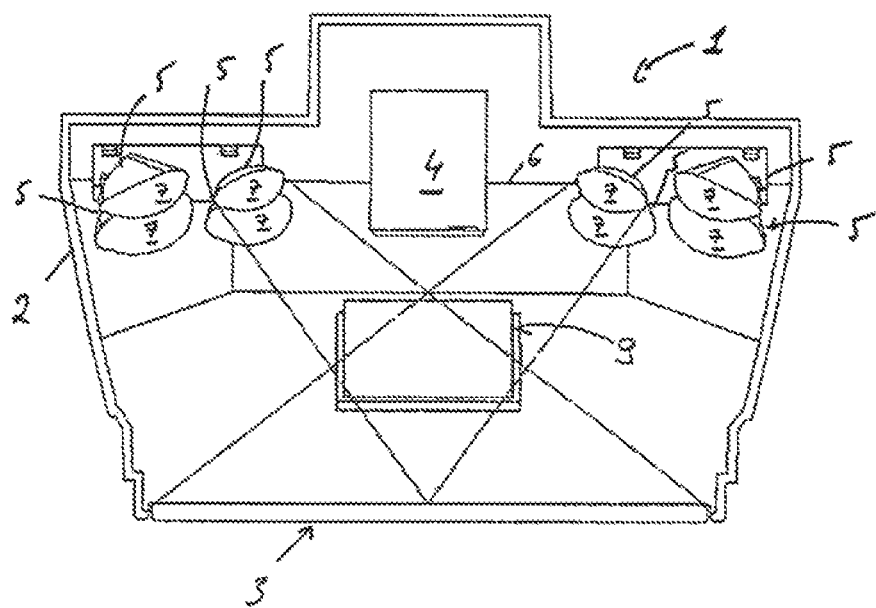
FIG. 1 is a schematic, perspective, cross-sectional view of a preferred embodiment of a 2D barcode scanner according to the invention, having a deflecting mirror arrangement.

The preferred embodiments of the present invention will now be described with reference to FIGS. 1 and 2 of the drawings. Identical elements in FIGS. 1 and 2 are designated with the same reference numerals.

Figure 2:
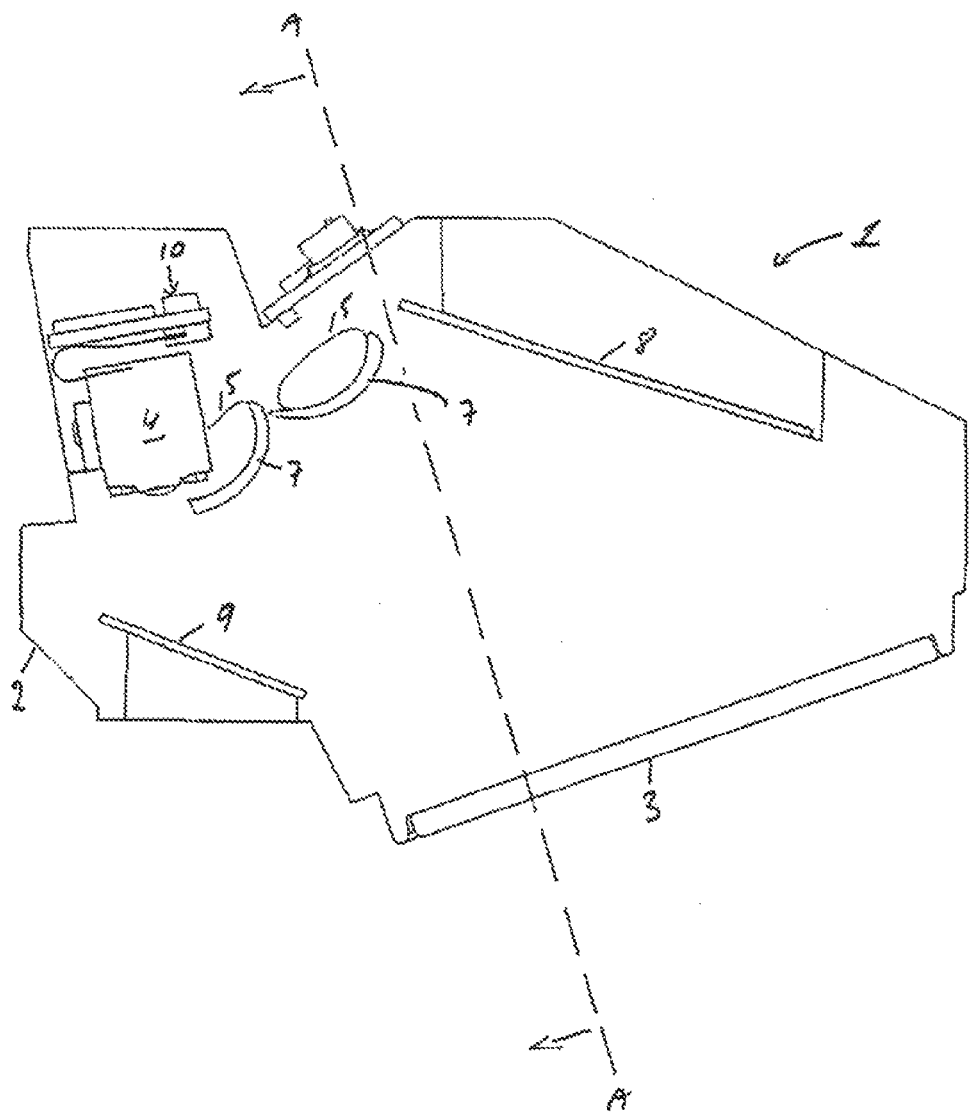
FIG. 2 is a schematic, perspective cross-sectional view of the 2D barcode scanner shown in FIG. 1.

According to the invention and with reference to FIG. 1, a 2D barcode scanner 1 designed according to the invention has a housing 2 with a reading window 3, in front of which the not shown barcode to be read is arranged. Furthermore, arranged at the side of the reading window 3 facing away from the barcode to be read is a digital camera 4, the images of which cover the entire reading window 3 via a deflecting mirror arrangement comprising a first and a second deflecting mirror, thus achieving a compact design since the distance required between the camera lens and the reading window 3 in order to detect the entire reading window 3 is realized via the deflecting mirrors. The view according to FIG. 2 shows a second deflecting mirror provided with the reference number 9.

The 2D barcode scanner 1 shown in exemplary fashion has eight external light sources 5 designed as LEDs, which are arranged in the plane 6 of the camera 4 mirror-symmetric to the projection of a symmetry axis of the reading window 3 at this plane 6. According to the invention, each external light source 5 is provided with one optical adapter 7, comprising at least one lens, through which the light from the external light source 5 is distributed such that the reflection paths arising for the external light source 5 are not illuminated or only with very low intensity from the inside of the reading window 3 via the deflecting mirror arrangement back into the digital camera 4, thereby avoiding the very bright spots in the image of the digital camera 4, the so-called hotspots, which arise due to the reflections, or significantly reducing the intensity thereof.

A homogeneous illumination level in the plane of the reading window 3 is achieved only when using all of the external light sources 5, wherein the areas of the plane of the reading window 3 that correspond to the reflection paths of a light source 5 are illuminated only or in the event that the reflection paths arising for the external light source 5 are illuminated by the light source with a very low intensity are illuminated mainly by the light sources 5 for which these areas do not constitute a reflection path. The optical adapters 7 associated with the light sources 5 are designed individually for the respective light source 5 and the orientation and arrangement thereof. Computation of the lens design for the optical adapters is preferably done using computer simulation.

The subject matter of FIG. 2 is a side view of the 2D barcode scanner 1 shown in FIG. 1, where the first and the second deflecting mirrors 8, 9 can be recognized. In this view, two of the total of 8 LEDs are visible, wherein each LED 5 has an individual optical adapter inserted in front of it. FIG. 1 corresponds to a sectional view taken along the line A-A in FIG. 2.

The optical adapter 7 associated with a light source 5 ensures that reflection paths arising for the respective external light source are not illuminated from the inside of the reading window 3, in the present case via the deflecting mirror arrangement, back into the digital camera 4 or are illuminated only with a very low intensity. As has already been explained, the areas of the plane of the reading window 3 that correspond to reflection paths of a light source 5 are illuminated by the other light source 5 for which these areas do not constitute a reflection path. The evaluation electronics that is associated with the digital camera 4 and that processes the image that has been taken with the digital camera 4 and detects the barcode digitally is shown schematically in FIG. 2 and provided with the reference sign 10.

There has thus been shown and described a novel 2D barcode scanner which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A 2D barcode scanner comprising a housing having a reading window and a digital camera arranged in the housing for capturing an image area of the reading window either directly or via a deflecting mirror arrangement, and at least one external light source for illuminating an area in front of the reading window on the side of the reading window that faces from the digital camera, the improvement wherein said at least one external light source includes a plurality of such light sources, each with an optical adapter for distributing the light therefrom, such that reflection paths at the inside of the reading window back into the camera are not illuminated or are illuminated with a very low intensity, wherein the external light sources are arranged in such manner that the location of bright spots that result are shifted in the image of the digital camera to an edge of the reading window where a read-out of barcodes is less frequent or less probable, and wherein the optical adapter associated with each external light source is designed individually for that respective light source and for the arrangement and orientation thereof, thereby avoiding or significantly reducing the intensity of the light reflections that arise on the inside of the reading window and are superimposed on a barcode that is to be read as very bright spots in the image of the digital camera.

2. The 2D barcode scanner as defined in claim 1, wherein the at least one external light source is arranged in the plane of the digital camera.

3. The 2D barcode scanner as defined in claim 1, comprising more than one external light source, wherein a homogeneous illumination level in the plane of the reading window is achieved only when using all said external light sources, and wherein areas of the plane of the reading window that correspond to the reflection paths of a light source are illuminated by light sources for which these areas do not constitute an illumination path.

4. The 2D barcode scanner as defined in claim 3, wherein some of said the external light sources radiate in the visible range and some in the near-infrared range with a wavelength of 800 to 900 nm, such that both conventional barcodes and barcodes readable in the near-infrared range can be read.

* * * * *